Nov. 6, 1962  R. E. TURNER ET AL  3,062,590
BALLAST EXTRACTION METHOD AND APPARATUS
Filed Jan. 11, 1960  2 Sheets-Sheet 1
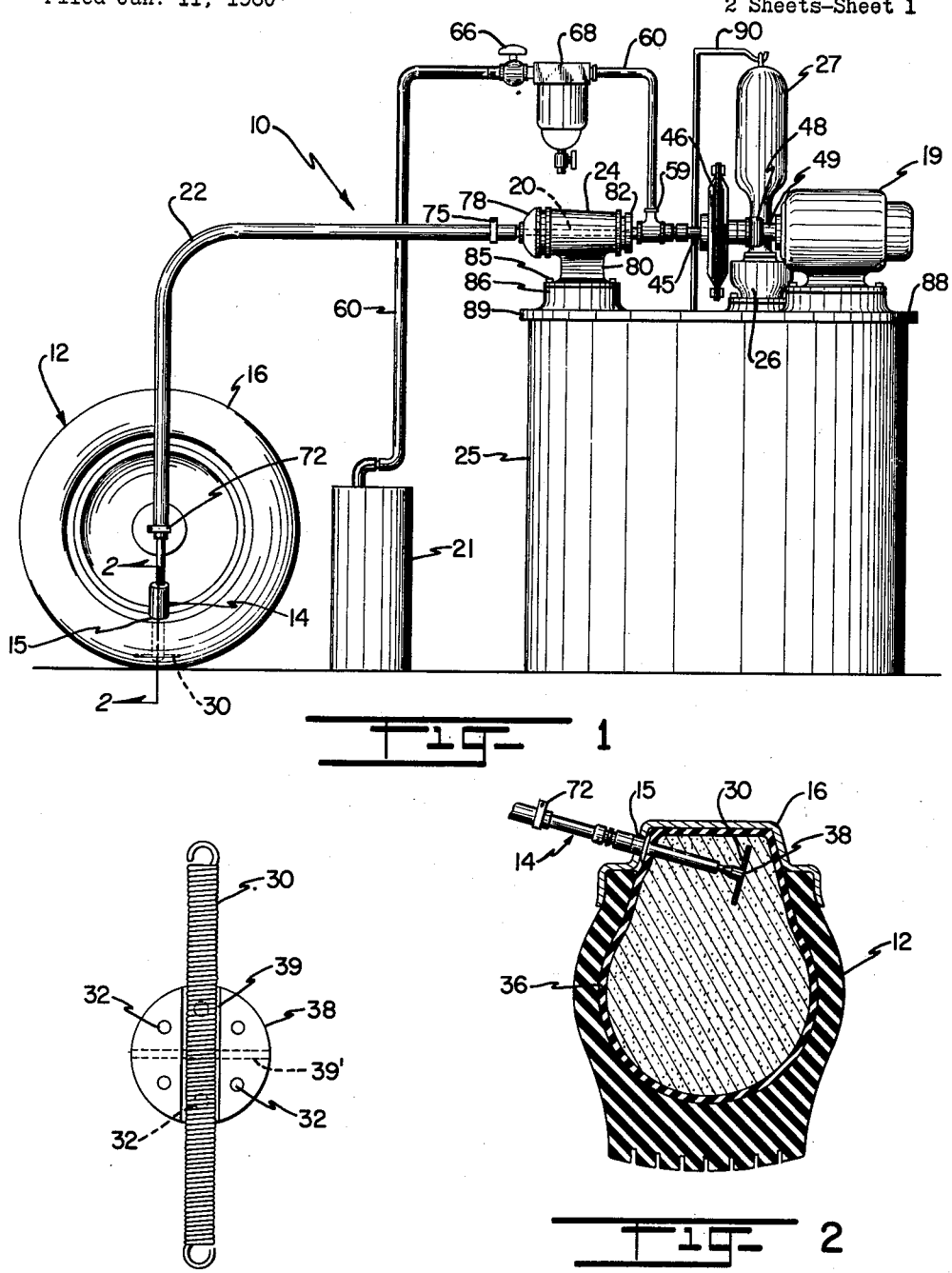
INVENTOR.
ROSCOE E. TURNER
WILLIAM H. NOWOTNY
BY
Philip H. Sheridan
ATTORNEY Nov. 6, 1962 R. E. TURNER ET AL 3,062,590
BALLAST EXTRACTION METHOD AND APPARATUS
Filed Jan. 11, 1960 2 Sheets-Sheet 2
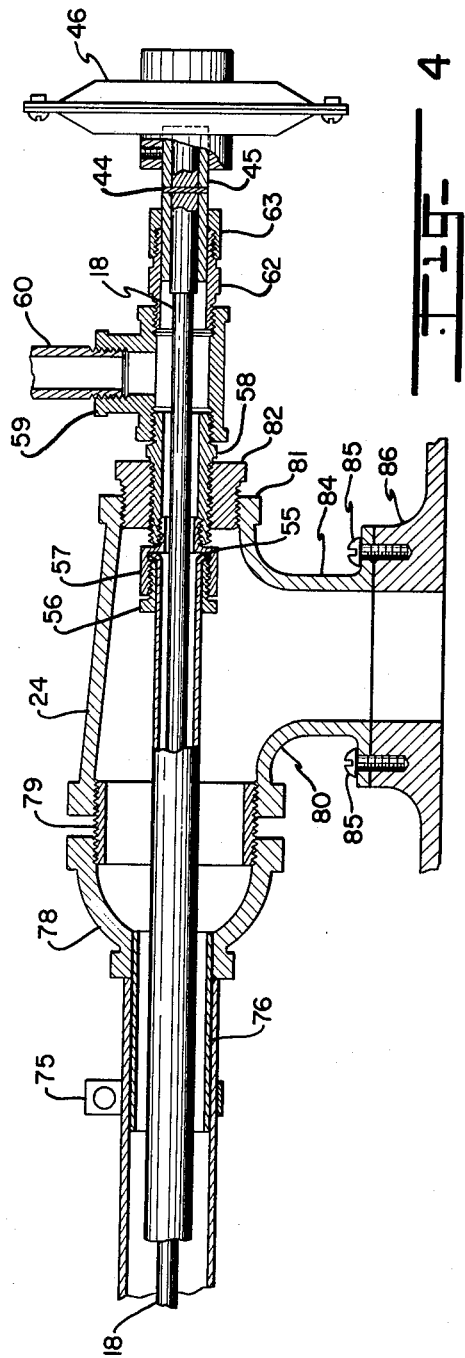
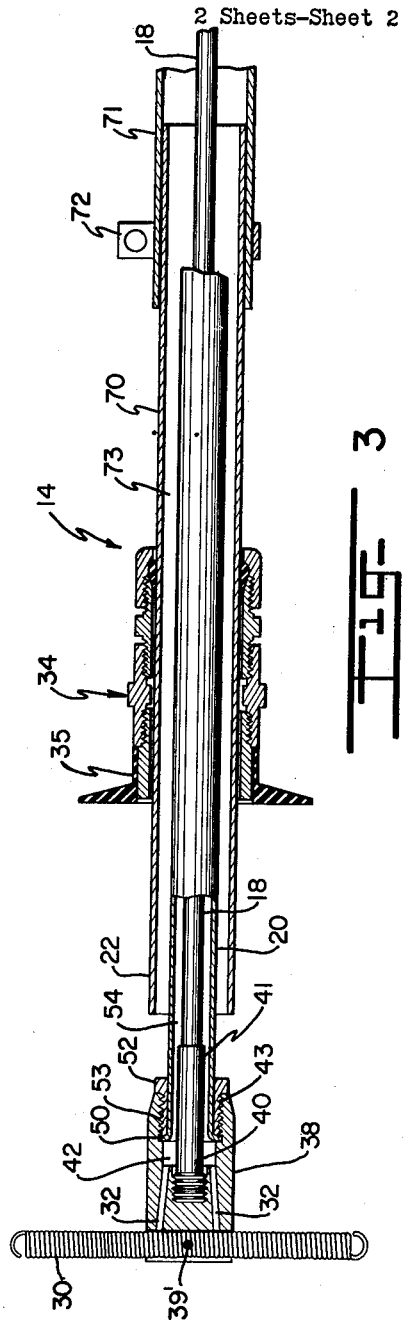
INVENTOR.
ROSCOE E. TURNER
WILLIAM H. NOWOTNY
BY
ATTORNEY United States Patent Office 3,062,590
Patented Nov. 6, 1962

3,062,590
BALLAST EXTRACTION METHOD AND
APPARATUS
Roscoe E. Turner, 5150 S. Santa Fe, Littleton, Colo., and
William H. Nowotny, 1557 Thesta, Fresno, Calif.
Filed Jan. 11, 1960, Ser. No. 1,661
8 Claims. (Cl. 302—58)

This invention relates to a novel and improved method and apparatus adapted for use in the removal of fine granular or powdery material from an inclosed chamber, such as a vehicle tire, having limited means of access thereto.

The features and advantages of the present invention may best be described by reference to the withdrawal or extraction of granular material such as ballast from a vehicle tire, and wherein most desirably extraction is carried out through the combined agitation and maintenance of a selected pressure differential in the vehicle tire through the injection of air therein, together with the simultaneous withdrawal of the ballast as it becomes aerated and loosened by the air through a low pressure line associated with the air injection means.

When the tire is stationary the ballast, which in motion normally occupies a majority of the space in the tire to the extent of almost completely filling it, will tend to pack down and become very difficult to remove. The removal operation is especially difficult in heavy-duty tires due to the weight of the ballast and thus it is highly desirable to mechanically loosen the material in addition to aerating and loosening it by means of air alone. At the same time, the means for agitating the material must be inserted through the limited opening at the valve, without removing the tire, and yet, some instrument of larger diameter would be more effective to cause shifting and displacement of the material.

In accordance with the present invention, it is proposed to provide for an improved method and means to accomplish the extraction of ballast from a vehicle tire in a minimum amount of time while insuring the complete removal of the material and in a most reliable manner. Moreover, the apparatus of the present invention is extremely compact and conformable for use under varying conditions with a high level of performance.

Accordingly, it is a primary object of the present invention to provide for an improved method and means for accomplishing the rapid and complete withdrawal of powdery or granular material such as ballast from an enclosed chamber having a limited entry area.

It is another object to provide for the efficient and reliable extraction of ballast material from a vehicle tire mounted on a wheel through the combined application of mechanical agitation and maintenance of a differential pressure in the tire sufficient to rapidly induce removal of material therefrom in a semi-fluid condition.

It is a further object to provide for an improved extractor so constructed and arranged as to be capable of entering the limited opening formed by the valve opening in a tire wheel rim for the purpose of carrying out physical agitation and aeration of ballast material contained in the tire, together with the simultaneous removal of ballast material without necessitating removal of the tire from the rim.

The above and other objects of the present invention will be more apparent from the following detailed description taken together with the accompanying drawings, in which:

FIGURE 1 is an elevational view of the improved extractor in accordance with the present invention;

FIGURE 2 is a cross sectional view of a vehicle tire illustrating the manner of insertion and attachment of an extractor tool of the present invention in relation to the tire;

FIGURE 3 is a view partially in section illustrating a preferred mode of assembly of a portion of the extractor apparatus in accordance with the present invention;

FIGURE 4 is a sectional view of the extractor tool; and

FIGURE 5 is an end view of the extractor tool.

Referring more specifically to the drawings, there is shown, for purposes of illustration and not limitation, in FIGURE 1, an improved extractor 10 designed in accordance with the present invention specifically for the removal or withdrawal of ballast from a vehicle tire, such as a heavy duty tractor tire 12. Essentially the extraction apparatus 10 is defined by a tool 14 adapted for insertion through the valve opening 15 in wheel rim 16 of the tire and with the tool being interconnected by means of a flexible drive 18 to a power source such as the motor 19. In addition, there is provided an air supply line 20 preferably disposed in outer concentric relation to the flexible drive and communicating with a source of compressed air 21 for injection through the tool into the interior of the tire, and also a bleeder line 22 in outer concentric relation to the air delivery line 20 and flexible drive 18 to enable the withdrawal of ballast material from the tire and through the line into a collector chamber 24 for depositing into a collection tank 25. Moreover, to aid in the withdrawal of the ballast from the tire, a vacuum unit 26 including a dust collector 27 communicates with the collection tank 25 and in turn with the bleeder line 22 to maintain a reduced pressure in the line and to encourage the withdrawal of the material from the tire for deposition and collection in the tank while simultaneously removing the dust and cleaning the material as it flows into the tank from the collector 24.

A primary feature of the present invention is the construction and arrangement of the extractor tool 14 which is adapted for insertion in sealed relation into the tire to carry out the combined mechanical agitation and aeration of the ballast material in the tire. The tool 14 is accordingly made up, as best seen from FIGURES 4 and 5 of a rotary or oscillatory beater 30 mounted for rotation on the flexible drive line or cable 18, the intermediate air injection line 20 communicating with orifices 32 for the delivery of air therethrough into the interior of the tire, and the bleeder line 22 preferably terminating just short of the end of the air delivery line 20 and disposed in outer concentric relation thereto, together with a connector 34 disposed on the outer concentric bleeder line 22 to establish interconnection between the tool and a specially constructed valve stem 35 secured to the inner tube 36 of the tire.

The beater member 30 is of necessity made of some collapsible construction which will permit folding or collapse upon the insertion of the distal end of the tool through the valve opening 15 and valve stem 35 into the interior of the tire and is most preferably formed of a rounded flexible element such as a coiled spring which will present no danger of accidentally tearing the tire during rotation or insertion and that will be of sufficient strength to be capable of effectively stirring and shifting the ballast material. A particular advantage of employing a coiled spring element as the beater is that upon rotation or oscillation of the spring, it will tend to elongate somewhat and due to its resiliency, will exert a whipping action so as to most effectively stir and cause agitation of the ballast. In this connection, however, it will be evident that the beater element may assume various similar forms and be composed of various materials entirely suitable for use to accomplish the above stated objectives. For example, plastic or rubber-like materials may be employed and the beater may consist of a number of radially extending elements emanating from a common center point or may consist of a single straight element as in the preferred form extending radially from the center in opposite directions.

To impart rotary or oscillatory movement to the beater element, the preferred arrangement for driving the beater is to provide a slotted fitting 38 incorporating the outwardly directed orifices 32 and having a slot 39 in its end face proportioned to accommodate the element 30 therein with a connecting pin 39' extending across the slot and through the beater to hold it in place. Additionally, the forward end of the fitting 38 includes a rearwardly facing counterbored portion 40 to permit threaded connection of a fitting 41 projecting from the end of the cable 18 through enlarged counterbored portion 42 at the rearward end of the fitting 38. In turn, the flexible drive cable 18 is preferably defined by a tubular portion composed of a rugged plastic material such as nylon and which extends rearwardly through the collector chamber 34 for connection by means of a drive pin 44 into a hollow drive shaft 45 projecting from one side of clutch 46. The driving side of the clutch 46 is connected by means of a self-aligning connector member 48 to a drive shaft 49 of the motor 19. The clutch 46 may be of any conventional type, although it is preferred to employ a ratchet-type slip clutch which upon starting of the motor 19 will establish engagement between the drive shafts 45 and 49 at all times to impart preferably continuous rotation to the beater, unless the beater should encounter an obstacle imposing an undue torsional strain on the flexible drive cable, at which point the slip clutch will immediately become disengaged in accordance with well-known practice.

In order to position the air delivery line 20 in stationary relation to the fitting 39, the extremity of the delivery line 20 is flared outwardly as at 50 for retention of a bushing 52 in journaled relation at the end thereof and with the bushing being exteriorly threaded as at 53 for connection to threaded end 43 of the fitting. The delivery line is most desirably formed of a metallic tubular material which is dimensioned to extend in outer concentric, spaced relation over the flexible cable thereby to define an annular space 54 for the delivery of air to the orifices 32 and through the openings 38' in the disc 38. The delivery tube 20 also extends through the greater length of the collection chamber 24 and is again flared at its rearward end as indicated at 55 to retain a bushing 56 which is connected into a coupling 57. The coupling 57 is also threaded at its opposite end for connection to a nipple 58 extending from one side of the cross portion of a T 59. The hollow stem of the T in turn is threaded to receive the mating threads of a pipe line 60 leading from the compressed air source shown in the form of the tank 21. Also, the opposite cross portion of the T is similarly provided with a nipple 62 and bearing 63, the latter being dimensioned to accommodate the end of the drive shaft 45 for rotation therein relative to the bearing and nipple portion.

To control the flow of air from the compressed air tank 21 through the delivery line 20 and orifices for injection into the tire, a valve 66 is stationed in the pipe line 60, together with an air-water separator 68 which is disposed in close association with the valve, in order to maintain the air as dry as possible for flow into the tire. The pressure of the air supplied through the delivery line 20 is governed primarily in accordance with the differential in pressure necessary between the interior of the line and bleeder line 22 to attain optimum withdrawal of the ballast material therefrom and of course taking into consideration the pressure capacity of the tire itself. Another factor to be taken into consideration is that the beater element 39 will serve as the primary agitator for loosening the ballast material and although the air will function to aerate the ballast, such will be merely secondary to its main purpose of acting as a drive medium causing the ballast to move toward the relatively low pressure bleeder line 22. In this connection however it is emphasized that the air does in fact cooperate with the beater element to agitate and loosen the material and accordingly the pressure of the air may be varied in relation to the speed and effectiveness of agitation created by the beater element itself. Thus, in the initial stages of removal it can be expected that the air pressure will be relatively high due to the compact formation and weight of the ballast, although as the operation proceeds, the air pressure may be successively reduced if desired since the beater element 30 will be capable alone of providing the necessary agitation of the ballast and the air pressure will serve merely to maintain the desired differential pressure.

The bleeder line 22 forms the outermost concentric member of the tool and consists of a relatively short length of a preferably metallic tubular member 70 terminating at one end as mentioned just short of the fitting 40 and at the opposite end is disposed in inner telescoping relation within a relatively long length of tubing 71 extending rearwardly for communication with the collection chamber 24. The tubular lengths 70 and 71 may be connected together by means of a pipe clamp 72 and again the tubing 71 is of a material which has some limited flexibility to permit angular adjustment of the entire string relative to the tire and to the collection chamber 24 and tank 25. Of course the distal end of the short tubular length 70 will be positioned in inserted relation within the tire for the purpose of withdrawing the ballast material as it becomes loosened through the combined mechanical agitation and injection of air, and to this end the annular space 73 formed between the bleeder line and air delivery line may be made relatively large in order that the ballast material will flow more easily therethrough into the collection chamber 24.

To establish communication between the bleeder line and collection chamber, the tubular length 71 is secured by means of a clamp 75 to a nipple 76 projecting from the inlet end of the chamber and the nipple 76 opens into the chamber for flow of the ballast material therethrough between the nipple and delivery line 20. The collection chamber 24 serves to provide an inclosure of increased area communicating with the tank itself while at the same time permitting the passage of the drive cable and pressure line therethrough for suitable connection into the source of compressed air and drive system respectively. To this end, the collection chamber may be comprised of a pair of reducer portions including a bell shaped reducer 78 connected at its reduced end to the nipple 76 and at its enlarged end is interconnected by means of a nipple 79 to reducer 80. The reducer 80 in turn tapers rearwardly into a reduced end portion 81 which may be interconnected by means of a block nut 82 to the nipple 58 and in this way close the rearward end of the chamber to prevent any accidental escape of ballast material therefrom. In addition, the reducer tee portion 80 converges downwardly into a hollow stem 84 which may be secured by means of suitable bolts 85 to an upstanding circular flange portion 86 forming the entry port into the collection tank 25. It will thus be evident that as the ballast material flows into the chamber it will readily move downwardly through the stem 84 and entry port into the tank for collection therein, and of course this is aided by means of the vacuum unit 26 positioned on the tank in communication with its interior.

The tank 25 may be of any desired shape, and is shown in the form of a hollow cylindrical container with a separate cover portion 88 having a downwardly directed peripheral edge which will fit tightly over the container in substantially sealed relation therewith. Although not shown in detail, the vacuum unit 26 may be connected into the lid with the intake side of the unit communicating with the interior of the tank and with the exhaust side leading into the dust collection bag 27. In the form shown, the collection bag may be suspended by means of a hanger 90 above the vacuum unit and will serve to collect the dust induced to become separated from the ballast by the vacuum unit as the ballast flows into the collection tank 25.

The tool 14 may be dimensioned for insertion through the valve opening 15 in the tire so as to be easily conformable for attachment either to a tubeless or tube-type tire and notwithstanding the condition, with respect to the latter, of the inner tube such as the tube 36. For the purposes of illustration, however, and assuming that the original valve stem of the tube is intact, the stem may be replaced by the special valve stem 35 merely by a simple curing operation followed by connecting the tool to the threaded projecting end of the stem by means of the coupler 34 positioned on the outer concentric bleeder line 22. Before insertion of the tool into the tire and positioning therewith, the tire should be rotated so that the valve opening is at its lowermost position whereupon the tool may easily be inserted downwardly through the stem into the interior of the tire followed by tightly securing the coupling 34 to the stem 35. Thereafter, the motor 19 may be switched on, the valve 66 opened and the vacuum unit 26 also energized to initiate the extraction operation. Due to the flexibility of the beater element 30, notwithstanding the compact formation of the ballast material, the element may at first be held in folded position so as to exert relatively little force in agitating the ballast material. However, through the combined delivery of air through the orifices at a high velocity together with the pressure differential established between the tire and the bleeder line, the ballast material will become rapidly loosened and begin to flow smoothly in an essentially semi-fluid state through the bleeder line for collection in the tank. Periodic checks may be made either by removing the lid 88 or by removing the tool from the tire to determine either the amount of ballast recovered or the amount lost respectively in order to insure that the material has been completely collected.

It will thus become apparent from the foregoing description that there is provided a greatly improved method and means for accomplishing the extraction of granular or powdery material through a limited opening from an enclosed area, such as exists where the ballast is employed in a vehicle tire. It will be further evident that the apparatus, and especially the construction of the tool and primarily the beater element has particular application to large masses of ballast material such as would be used in higher capacity tires for heavy duty work, due to the cooperative relationship which exists in the combined application of air and mechanical agitation of the material. It will further be evident that many variations may be adopted without departing from the principles of the invention, such as for example, the bleeder line need not be connected to a source of vacuum since the injection of air into the tire in itself will provide the necessary pressure differential and if necessary the ballast may merely be collected in an open container without the specially formed tank. However, the overall performance is greatly improved by positively reducing the pressure in the bleeder line and also providing for removal of dust from the ballast as it flows into the collection tank by means of the vacuum unit. Of course, various other modifications and changes may be made in the method and apparatus of the present invention without departing from the scope thereof as defined by the appended claims.

What is claimed is:

1. In an extraction apparatus wherein a fluid delivery line and a withdrawal line are adapted for insertion through the valve opening in a vehicle tire for the removal of ballast through the withdrawal line by the combined aeration of the ballast and pressure differential established in the tire, the combination of a mechanical agitator comprising a collapsible beater element insertable through the valve opening for rotation independently of the air delivery line and withdrawal lines, and flexible drive means connected to said beater to impart rotary movement thereto thereby to agitate and loosen the ballast in cooperation with the air for removal of the ballast through the withdrawal line, said agitator being journaled for rotation in the air delivery line with the beater element projecting laterally beyond the end of the delivery line, a fitting positioned for interconnection of said flexible drive means and said beater element in inner concentric journaled relation to the air delivery line, and said fitting including a series of outwardly directed orifices communicating with the air delivery line to direct the air under pressure into the interior of the tire.

2. In an extraction apparatus according to claim 1 wherein said beater element is formed of a coiled spring member extending perpendicularly to said drive means.

3. Apparatus for use in removing ballast contained in a vehicle tire comprising: a series of concentric tubular members dimensioned at their distal ends for insertion through the valve opening in the tire including a flexible drive member having a fitting disposed at its distal end, said fitting including an air delivery line for the introduction of air into the tire, and an outer bleeder line positioned in outer concentric relation to said air delivery line; a rotatable beater element disposed on said fitting being collapsible for projection through the valve opening along with said concentric tubular members with means including a drive shaft coupled to said drive member to impart rotation to said beater element; a source of compressed air connected to said air delivery line for the introduction of air under pressure into the interior of the tire to aerate the ballast material and being cooperative with said beater element to agitate and loosen the ballast; means communicating with said bleeder line for withdrawing and collecting the ballast material including means to establish a reduction in pressure in said bleeder line relative to that in the tire so as to encourage the withdrawal of the ballast through said bleeder line into said tank; and connector means disposed adjacent the distal end of said bleeder line for mounting of said concentric members in inserted sealed relation through the valve opening in the tire for withdrawal of the material therefrom.

4. Apparatus for use in removing ballast contained in a vehicle tire comprising: a series of concentric tubular members dimensioned at their distal ends for insertion through the valve opening in the tire including a flexible drive member having a fitting disposed at its distal end, said fitting including an inner rearwardly facing counterbored portion for connection of the end of said flexible drive member, and an outer counterbored portion at the rearward end thereof communicating with a series of outwardly directed orifices in said fitting, an air delivery line journaled to the rearward end of said fitting in outer concentric spaced relation to said drive member for the introduction of air through the orifices, and an outer bleeder line positioned in outer concentric relation to said air delivery line; a rotatable beater element secured to said fitting being collapsible for projection through the valve opening along with said concentric tubular members with means including a drive shaft coupled to said drive member to impart rotation to said beater element; a source of compressed air connected to said air delivery line for the introduction of air under pressure through the orifices into the interior of the tire to aerate the ballast material and being cooperative with said beater element to agitate and loosen the ballast; means for withdrawing and collecting the ballast communicating with said bleeder line including means to establish a reduction in pressure in said bleeder line relative to that in the tire so as to encourage the withdrawal of the ballast through said bleeder line into said tank; and connector means disposed adjacent the distal end of said bleeder line for mounting of said concentric members in inserted sealed relation with the tire for withdrawal of the material therefrom.

5. Apparatus for use in removing ballast contained in a vehicle tire comprising: a series of concentric tubular members dimensioned at their distal ends for insertion through the valve opening in the tire including a flexible drive cable having a fitting disposed at its distal end, said fitting including an inner rearwardly facing counterbored portion for connection of the end of said drive cable, together with an exterior slotted portion and an outer counterbored portion at the rearward end thereof communicating with a series of forwardly directed orifices in said fitting, an air delivery line journaled to the rearward end of said fitting in outer concentric spaced relation to said drive cable for the introduction of air through the orifices, and an outer bleeder line positioned in outer concentric relation to said air delivery line; a rotatable beater element defined by a coiled spring mounted in the exterior slotted portion of said fitting being collapsible for projection through the valve opening along with said concentric tubular members with means including a drive shaft and clutch coupled to said drive member to impart rotation to said beater element; a source of compressed air connected to said air delivery line for the introduction of air under pressure through the orifices into the interior of the tire to aerate the ballast material and being cooperative with said beater element to agitate and loosen the ballast; means for withdrawing and collecting the ballast with said bleeder line; and connector means disposed adjacent the distal end of said bleeder line for mounting said concentric members in inserted sealed relation with the tire for withdrawal of the material therefrom.

6. Apparatus for use in removing ballast contained in a vehicle tire comprising: a series of concentric tubular members dimensioned at their distal ends for insertion through the valve opening in the tire including a flexible drive member having a fitting disposed at its distal end, said fitting including an inner rearwardly facing counterbored portion for threaded connection of the end of said flexible drive member, together with an exterior forwardly displosed slotted portion and an outer counterbored portion at the rearward end thereof communicating with a series of forwardly directed orifices in said fitting, an air delivery line journaled to the rearward end of said fitting in outer concentric spaced relation to said drive member for the introduction of air through the orifices, and an outer bleeder line positioned in outer concentric relation to said air delivery line; a rotatable beater element defined by a coiled spring member disposed in the exterior slotted portion of said fitting being collapsible for projection through the valve opening along with said concentric tubular members, and means including a drive shaft and clutch coupled to said drive member to impart rotation to said beater element; a source of compressed air connected to said air delivery line for the introduction of air under pressure through the orifices into the interior of the tire to aerate the ballast material and being cooperative with said beater element to agitate and loosen the ballast; means for withdrawing and collecting the ballast including a collection tank, a collection chamber communicating with said bleeder line for deposition of the material into said tank, and a source of vacuum connected into said tank to establish a reduction in pressure in said bleeder line relative to that in the tire so as to encourage the withdrawal of the ballast through said bleeder line into said tank; and connector means disposed adjacent the distal end of said bleeder line for mounting of said concentric members in the valve opening in inserted sealed relation with the tire for withdrawal of the material therefrom.

7. Apparatus for use is removing ballast contained in a vehicle tire comprising, a series of concentric tubular members dimensioned at their distal ends for insertion through the valve opening in the tire including a flexible drive member, a fluid delivery line operatively associated with the drive member for the introduction of fluid into the tire and a bleeder line positioned in close relation to said delivery line for simultaneous withdrawal of ballast from the tire as fluid is being introduced into the tire, a rotatable beater element secured to said drive member and means including a drive shaft coupled to said drive member to impart rotation ot said beater element, a fluid source connected to said fluid delivery line for the introduction of fluid under pressure into the interior of the tire to aerate the ballast material and being cooperative with said beater element to agitate and loosen the ballast, withdrawal means communicating with said bleeder line for withdrawing and collecting the ballast material including means to establish a reduction in pressure in said bleeder line relative to that in the tire, and connector means disposed adjacent the distal ends of said concentric tubular members for mounting of said members in inserted sealed relation through the valve opening in the tire for withdrawal of the material therefrom.

8. Apparatus according to claim 7 wherein said beater element is characterized by being of a normal size greater than the valve opening and being collapsible for insertion therethrough into the interior of the tire.

References Cited in the file of this patent

UNITED STATES PATENTS

| 961,563 | Volckening | June 14, 1910 |
| 1,044,920 | Schilow | Nov. 19, 1915 |
| 2,222,047 | Snyder | Nov. 19, 1940 |
| 2,239,010 | McMillan | Apr. 22, 1941 |
| 2,259,144 | Volckening | Oct. 14, 1941 |
| 2,339,381 | Crowley | Jan. 18, 1944 |
| 2,434,481 | Anderson | Jan. 13, 1948 |
| 2,581,914 | Darrow | Jan. 8, 1952 |
| 2,679,061 | Baker | May 25, 1954 |
| 2,686,045 | Byberg | Aug. 19, 1954 |

FOREIGN PATENTS

| 5,876 | Germany | June 25, 1879 |